United States Patent [19]
Lallement

[11] Patent Number: 5,553,247
[45] Date of Patent: Sep. 3, 1996

[54] METHOD FOR UNBLOCKING A MULTIBUS MULTIPROCESSOR SYSTEM

[75] Inventor: Philippe Lallement, Le Chesnay, France

[73] Assignee: Alcatel Cit, Paris, France

[21] Appl. No.: 355,280

[22] Filed: Dec. 12, 1994

Related U.S. Application Data

[63] Continuation of Ser. No. 51,283, Apr. 23, 1993, abandoned, which is a continuation of Ser. No. 459,410, Dec. 29, 1989, abandoned.

[30] Foreign Application Priority Data

Dec. 30, 1988 [FR] France .................................. 88 17506

[51] Int. Cl.⁶ .................................................. G06F 13/364
[52] U.S. Cl. .............. 395/293; 395/185.09; 364/DIG. 2; 364/937.01; 364/940.1
[58] Field of Search ...................................... 395/200, 325, 395/575, 650, 725, 185.09, 293; 364/DIG. 1, DIG. 2

[56] References Cited

U.S. PATENT DOCUMENTS

| | | | |
|---|---|---|---|
| 3,641,505 | 2/1972 | Artz et al. | 340/172.5 |
| 4,281,380 | 7/1981 | DeMesa, III et al. | 395/325 |
| 4,527,271 | 7/1985 | Hallee et al. | 371/20 |
| 4,584,678 | 4/1986 | Ozeki et al. | 370/85 |
| 4,620,278 | 10/1986 | Ellsworth et al. | 364/200 |
| 4,633,392 | 12/1986 | Vincent et al. | 364/200 |
| 4,707,829 | 11/1987 | Penose | 370/86 |
| 4,719,458 | 1/1988 | Miesterfeld | 340/825.5 |
| 4,723,311 | 2/1988 | Moustakas et al. | 455/612 |
| 4,751,701 | 6/1988 | Roos et al. | 370/85 |
| 4,766,536 | 8/1988 | Wilson, Jr. et al. | 395/325 |
| 4,818,985 | 4/1989 | Ikeda | 340/825.5 |
| 4,835,737 | 5/1989 | Herrig et al. | 364/900 |
| 4,858,112 | 8/1989 | Puerzner et al. | 395/325 |
| 4,920,533 | 4/1990 | Dufresne et al. | 370/85.2 |
| 4,929,940 | 5/1990 | Franaszek et al. | 340/825.02 |
| 4,939,510 | 7/1990 | Masheff et al. | 340/825.5 |
| 4,958,271 | 9/1990 | Yoshida et al. | 395/275 |
| 4,965,792 | 10/1990 | Yano | 370/85.2 |
| 4,974,153 | 11/1990 | Pimm et al. | 364/200 |
| 4,977,532 | 12/1990 | Borkowicz et al. | 364/708 |
| 5,058,101 | 10/1991 | Albanese et al. | 359/127 |
| 5,129,090 | 7/1992 | Bland et al. | 395/725 |
| 5,140,586 | 8/1992 | Kloper et al. | 370/85.5 |
| 5,157,659 | 10/1992 | Schenkel | 370/85.3 |
| 5,167,022 | 11/1992 | Bahr et al. | 395/325 |
| 5,168,568 | 12/1992 | Thayer et al. | 395/725 |

OTHER PUBLICATIONS

Rosenberg, J. M. 'Dictionary of Computers, Information Processing & Telecommunications', 2nd Ed., (1987), pp. 309–310.

Commutation & Transmission, vol. 7, No. 3, 1985, pp. 69–78, Paris, France; M. Ducourant; "Le systéme multiprocesseur x83".

*Primary Examiner*—Thomas G. Black
*Assistant Examiner*—Maria N. Von Buhr
*Attorney, Agent, or Firm*—Sughrue, Mion, Zinn, Macpeak & Seas

[57] ABSTRACT

In the field of multiprocessor systems of the type including at least one processing module made up of processors which are connected to a main bus or several processing modules which communicate with each other via bus coupling modules, a bus deblocking system is provided in which, using a perfectly mastered process, progressive and iterative deblocking of a multibus system;subject to a general or overall blocked situation is achieved by allocating to a specific deblocking board a module blocking detection function and a bus release function for the module. The bus release function sends one single decongesting signal having the following effect on all the processors of the module: first, inhibition of the bus allocation system, the system employing simultaneous access request arbitration; and second, cancellation of the bus ownership signal.

9 Claims, 4 Drawing Sheets

METHOD FOR UNBLOCKING A MULTIBUS MULTIPROCESSOR SYSTEM

This is a continuation of application Ser. No. 08/051,283 filed Apr. 23, 1993 abandoned, which is a continuation of application Ser. No. 07/459,410 filed Dec. 29, 1989, abandoned.

FIELD OF THE INVENTION

This invention relates to multiprocessor systems of the type including at least one processing module made up by processors which are connected to a main bus. In more general terms, the invention relates to multibus systems in which several processing modules communicate with each other via bus coupling modules.

A configuration of this type notably occurs in data switching systems of the type of the family of switches marketed by the present applicant under the name "Alcatel 8300".

BACKGROUND OF THE INVENTION

In this type of multiprocessor system, each processor includes means for managing access to the main bus of the module to which it belongs by using a two-phase process. During a first phase, corresponding for example to one clock cycle, the whole set of bus access requests originating from all the processors in the module are handled by a priority arbitration logic in order to identify a winner in the assignments process. This "winner" then becomes the bus's next owner or "master". During a second phase, in other words when the bus of the module becomes available, the bus seizure circuit associated with the winning processor ensures exclusive access of the processor to the bus by sending a bus ownership signal.

In the case of multibus systems, the bus coupling modules are responsible for providing communication between the various processing modules on different buses which cooperate in a pairwise manner from one bus to the next. The communication is provided in order to establish two-way links using conventional access requests on the corresponding destination bus.

It will be noticed that transmission of data from one module to another can lead to passage through several successive buses in order to reach the destination processor.

In a known manner, interference in the signals travelling on the bus either as the result of a fault in the sending circuit or the receiving circuit on a board which is connected to the bus, or as a result of a short circuit in the back-plane, or for other reasons, can lead to either the allocation modules, or the bus seizure logic and bus management logic in the boards present on the bus becoming blocked. When such blocking takes place at the precise moment when a bus coupling module is in the process of communication with a remote module, the blocking situation can become propagated to other buses; in the worst case situation, complete blocking of the whole configuration can occur.

Procedures for unblocking a multibus multiprocessor system exist already.

Among these procedures there are those known ones which consist of causing the system board to send a bus reset signal. The reset signal serves the purpose of acting on the connection registers of the processors in each module, and of the bus coupling modules, so as to forbid prevent each board from sending information over the bus. The boards, however, are not inhibited from receiving signals present on the bus.

However, the sending of a reset signal is poorly suited to multibus structures in which loops are present. In effect, in the case where at least three buses are linked together two-by-two, in a closed sequence or loop circuit, there is no way of stopping the sending of a reset signal covering the entire looped system. The reset signal is now in a self-maintaining situation as a result of the mechanisms which are specific to neutralization. This means that it is necessary to carry out the reset bus by bus, and not by means of a general reset.

On the other hand, the system board may, under certain circumstances, experience difficulties in gaining control of the bus either as the result of conflict with a bus coupling module board or as a result of loss of access priority to the bus.

SUMMARY OF THE INVENTION

The invention has the aim of overcoming the above disadvantages by supplying a bus deblocking system by means of a perfectly mastered process which makes it possible to provide progressive and iterative deblocking of a multibus system subject to a general or overall blocked situation. The method in accordance with the invention thus provides the advantage of allowing the failed module to be isolated from the other modules in the system, without disturbing the system software configuration and without disturbing possible bus cycles that are currently running.

Moreover the solution according to the invention provides perfect compatibility with existing systems for managing reciprocal and simultaneous access request conflicts between two buses.

The method in accordance with the invention is finally also capable of being used to allow sending of several consecutive cycles without releasing the bus.

These aims together with others which will appear later are achieved through the use of a method for unblocking a multiprocessor system, the system being of the type including at least one processing module each of which is made up by processors connected to a single main bus, each of said processors including a main bus access management cell employing two phases comprising, firstly, a bus allocation system supplying, during a first phase, a negative or positive result signal, for the processor, of the arbitration of access requests expressed during the same cycle by the processors of the module, and, secondly, a bus seizure circuit providing, during a second phase, access to the bus of the processor by sending a bus ownership signal where the result is positive from the allocation system during said first phase, wherein the improvement consists in allocating to a specific deblocking board a module blocking detection function and a bus release function for said module, and where said bus release function consists in sending one single decongesting signal having the effect of causing on all the processors of the module, firstly, a forcing to negative of the result of allocation, and, secondly, a forcing to the canceled situation of said bus ownership signal.

Advantageously, the method according to the invention finds its application in multiprocessor systems in which said arbitration result signal from the allocation module is supplied by an arbitration logic of the module, said arbitration logic receiving at its input a signal indicating a participation in allocation from each one of the processors issuing a bus access request during a given cycle.

In this case, in accordance with the invention, said single decongestion signal inhibits participation in allocation by each one of sailed processors in the module.

In accordance with an advantageous manner of putting the invention into practice, in the case where a set of at least two processing modules are present, each processing module communicating with at least one other module over a symmetrical pair of main bus coupling modules, each bus coupling module participating in the allocation and bus seizure mechanisms on the destination bus, the deblocking method includes the novel feature that said single decongestion signal is sent to the allocation module and to the bus seizure circuit of each one of said coupling modules connected to the bus that needs to be unblocked.

Where blocking in cascade of several buses interconnected by coupling modules has occurred, advantageously and in accordance with the invention said unblocking board decongests in an iterative fashion each one of the buses, starting with the bus that is the most close, by alternating an operation in which the decongestion signals is sent on the bus from the unblocking board in order to release it, and then sending to the bus coupling module of said released bus an instruction to transmit the decongestion signal to the next bus and/or an instruction inhibiting the allocation module of said coupling module in order to isolate said next bus when it is at fault.

In accordance with one preferred characteristic of the invention, in the case where the bus coupling modules are provided with means for collision management of reciprocal requests for access during a given cycle between two adjacent buses, said bus decongestion signal and the collision resolving signal are constituted by one single signal.

On the other hand, in the case of sending of a collision signal by a bus coupling module, provision can be made to optionally send a reset signal prior to the sending of said decongestion signal on the bus of the corresponding blocked module.

Advantageously, said decongestion board includes means for firstly identifying the faulty board and/or the module of the faulty board that gave rise to the blocking situation, and secondly, for neutralizing said board, and/or isolating said module.

In accordance with the invention, said decongestion board is advantageously the system reset board of said multiprocessor system and/or a supervisory board of one of the processing modules of said multiprocessor system.

Other advantages and characteristics of the invention will become more clear from reading the description which follows of preferential embodiments of the method in accordance with the invention, which are provided by way of illustration and should not be considered as limiting, in conjunction with the attached drawings.

DETAILED DESCRIPTION OF PREFERRED EMBODIMENTS

Figure 1:
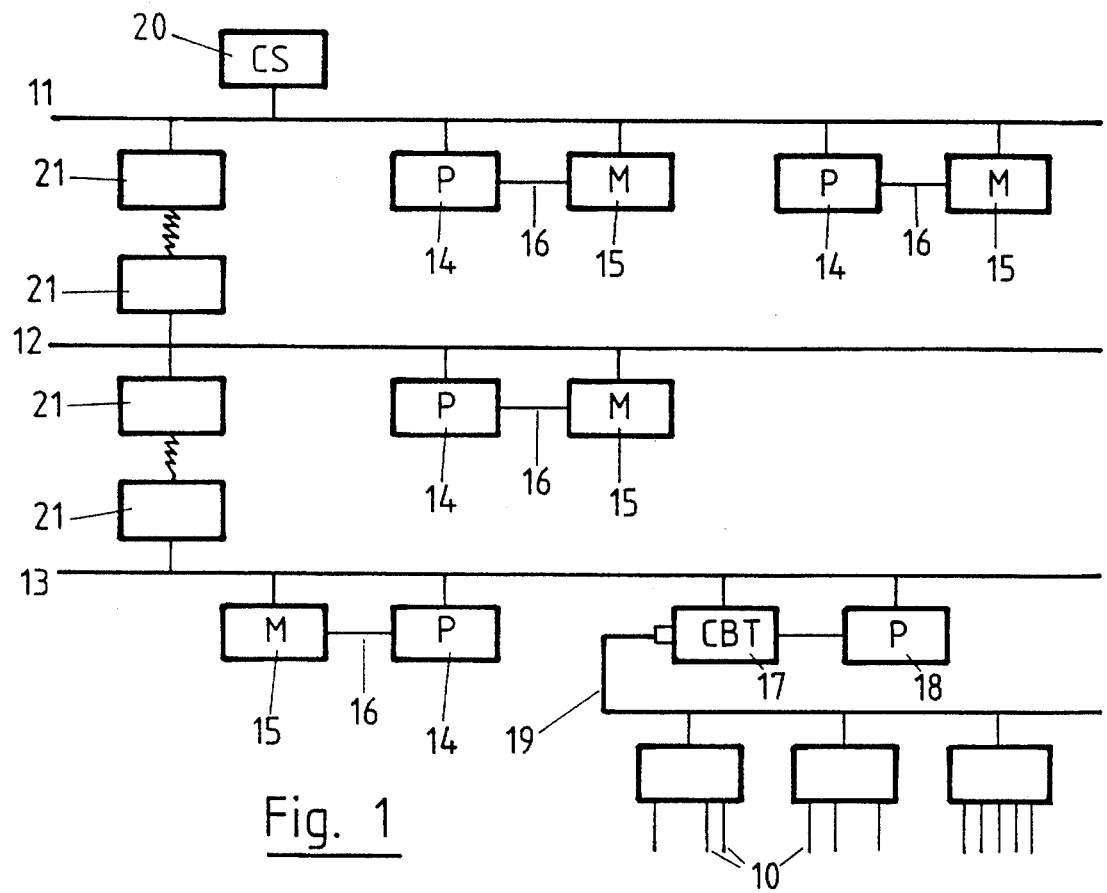
FIG. 1 illustrates the general configuration of a multibus multiprocessor system for application to data switching, to which the method in accordance with the invention is applicable.

The multiprocessor and multibus system shown in FIG. 1 is a schematic representation of an application taking the form of a data switch.

The function of a data switch is to receive digital data introduced by transmission lines 10 and to sort and regroup such data into multiprocessor processing means in order to retransmit them over suitable output lines 10.

In a simplified version of the multiprocessor multibus switch, a management bus 11, a processing bus 12, and a switching bus 13 can be distinguished. Each one of these buses 11, 12, 13 corresponds to a processing module each comprising at least one processor 14, each being optionally associated with a local memory 15 via a local bus 16. The switching bus 13 further includes a terminal bus coupling module 17, which, in association with a processor 18, manages the terminal transmission bus 19 for connection of the send/receive lines 10.

The management bus 11 further includes a system board 20, the function of which is to supervise the whole multibus multiprocessor system.

The buses 11, 12, 13 are for example buses of the XBUS type (manufactures by the French Company Alcatel CIT) which principally carry five types of signal:

address signals;

two-way data signals;

control signals intended for data interchange;

control signals intended for bus allocation;

control signals intended for system management.

Each bus receives, for example, sixteen processors as a maximum (master board), the other locations being able to correspond to physical addresses of slave boards (for example memory boards).

The buses 11, 12, 13 of the different multiprocessor system modules communicate with each other via bus coupling modules 21 connected in pairwise fashion.

Figure 2:
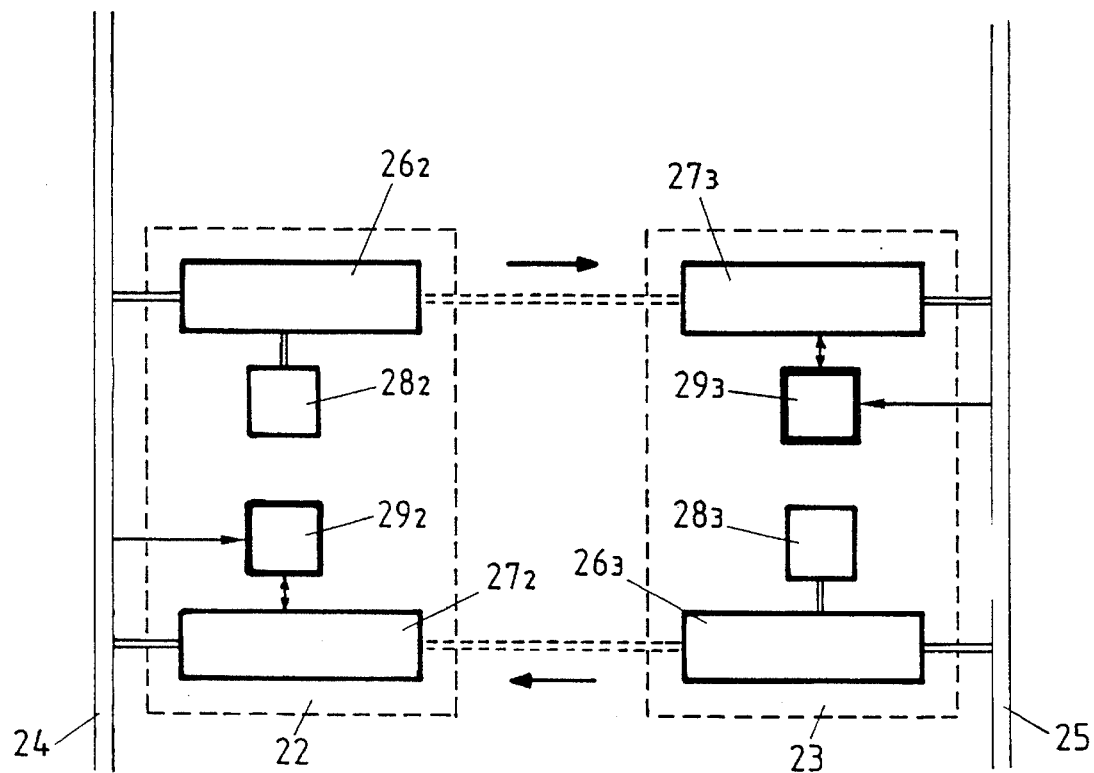
FIG. 2 shows schematically the principle of connecting two adjacent buses via a pair of bus coupling modules, in the system shown in FIG. 1.

FIG. 2 illustrates the structure and operation of a pair of bus coupling modules 22, 23 providing communication between two buses 24, 25.

Several types of bus coupling modules can be envisaged. By way of example, we could mention here coupling modules the operation of which is of the "mailbox" type.

The example discussed here corresponds to operation with "address filtering" which simulates a prolongation of the sending bus. Each coupling module 22, 23 includes, firstly, a receiving module $26_2$, $26_3$ for data originating from buses 24, 25 respectively, and, secondly, a module $27_2$, $27_3$ for sending over bus 24, 25, data received from the remote coupling module 23, 22 respectively. As a consequence, connection of the two coupling modules 22, 23 takes place, firstly, between the receiving module $26_2$ and the sending module $27_3$ (data transfer from bus 24 to bus 25), and, secondly, between the receiving module $26_3$ and the sending module $27_2$ (data transfer from bus 25 to bus 24).

Each of the sending modules $26_2$, $26_3$ cooperates with a memory $28_2$, $28_3$ carrying specific address tables of remote buses. Transfer decisions taken by each coupling module 22, 23 depends on the content of these address tables.

Furthermore, each sending module $27_2$, $27_3$ cooperates with means $29_2$, $29_3$ for managing access to bus 24, 25.

A detailed example of this type of bus coupling module can be found in the French patent document application No. 82 21401 dated Dec. 21, 1982.

Figure 3:
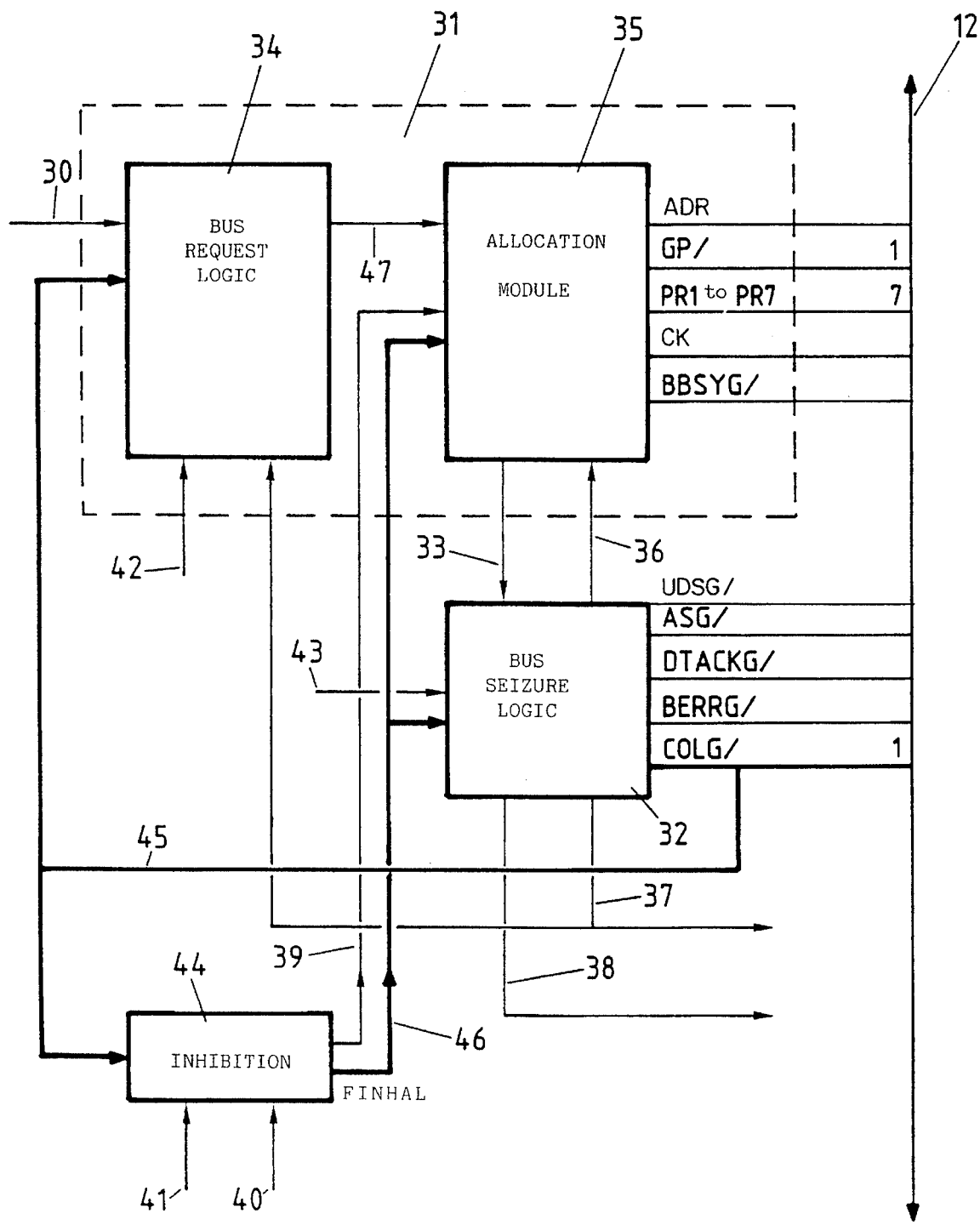
FIG. 3 is a schematic illustration of the access request logic and bus allocation and seizure logic associated with one processor of the system in FIG. 1 with distributed bus assignment and compatible with the method according to the invention.

FIG. 3 shows the bus access request logic for each ownership processor of the single bus processing modules 11, 12, 13. The access request logic consists, firstly, of an access allocation system 31, which is synchronous and distributed, using an arbitration process for access requests 30 expressed by the processors, and, secondly, a bus seizure logic 32 connected to the allocation system 31 by a bus seizure enable or inhibit signal 33 as a function of the result of the distributed allocation operation.

The allocation system 31 is made up firstly by a bus request logic 34, formed by a flip-flop (not shown) for synchronizing signals with a clock signal of the allocation module 35's clock signal, and, secondly, the actual allocation circuit 35 which receives access request 47 from the logic 34 and is responsible for arbitrating access requests and sending the result 33 of arbitration for the associated processor. Arbitration is carried out either using a fixed priority or a rotating priority.

The sixteen physical master board addresses connected to bus 12 are divided over two groups of 8 addresses, one group of which has priority (signal GP/). In each of the groups, priority is assigned via priority signals PR1 to PR7. The signals GP/ and PR1 and PR7 are input/output as open collector signals on the main bus 12.

With fixed priority, priorities increase in an order from 0 to 7, and are each assigned to one processor connected to a physical address on the bus. Definition of the next owner or "master" of bus 12 is performed by logic which overwrites the "1s" on the signals PR: at the end of an allocation cycle, the arbitration "winner" is the one that belongs to the active group GP and which has its PR line active.

With rotating priority, the priority locations (PR0 to PR7) are variable through reassignment of the lowest priority to each board that has seized the bus the most recently.

The allocation circuit 35 also includes other lines for communication with bus 12, notably lines for ADR identifying the address of the physical location of the access allocation system 35; lines GP/ and PR1 to PR7 for indicating the current owner of the bus (used with rotating priority), a clock signal line CK for synchronizing all the access allocation modules 35; and a bus busy line BBSYG/.

When a participating processor is designated, following the allocation operation, it transmits this information to the bus seizure logic 32, using the allocation result signal 33. This logic 32 supervises bus 12, and at the end of the current cycle, takes over the bus and sends a signal 36 to the allocation module 35 authorizing a fresh allocation for the next owner of the bus.

The bus seizure circuit 32, on the other hand, sends over bus 12 an address strobe signal indicating an address is currently in cycle or a data strobe signal indicating data currently in cycle, and receives data acknowledgement signals. Finally, circuit 32 also sends signals 37, 38 indicating ownership of the address bus and the data bus.

The board also includes a line 39 for putting allocation module 35 out of operation upon a reset command 40 being issued, or following an external inhibiting instruction 41, for example a disconnection instruction transmitted by the system board 20. The bus request logic 34 and bus seizure logic 32 also include respective reset lines 42, 43.

Operation and transfer of data in the system according to FIG. 1 is as follows:

The transfer cycles are asynchronous, so that the bus is blocked by the board that has control of it or "master" that is making a request until the moment where the board addressed answers. Should there be no answer from the destination board, a "watchdog timer" (not shown) is started on the "requesting" board leading to release of the bus and change over to error processing.

The bus coupling modules 21 analyze the addresses passing on their bus, and after address filtering, open up a path to the remote bus when necessary. Thus, processor 14 connected to bus 11 is able to address processor 14 or memory 15 connected to bus 12. In this case, the operation first of all blocks bus 11. The coupling module 21 of bus 11 recognizes the address requested and opens up the path towards bus 12 which it seizes and blocks when the latter is not busy. There is then an answer from the destination end and the sending processor then releases the two buses 11 and 12 upon receiving the answer from the destination end.

A transfer from bus 11 to bus 13 will require the use of intermediate bus 12 where a pair of specific coupling modules which directly couple bus 11 and bus 13 are absent. The watchdog timers (not shown) on each of the processors are given values so as to allow a transfer to be executed which involves cascading of the maximum number of buses concerned by a transfer to the most remote position.

As has already been said in the introduction, interference or disturbance in the signals on a bus, either as a result of a fault in the sending circuit or receiving circuit on a board, or originating from a short circuit in a backplane, leads to allocation modules 35 becoming blocked or to blocking of the bus seizure logic 32 of the boards connected to the bus. When blocking occurs at a moment where the code present on the address bus corresponds to the address of a board which is on another bus, blocking can get propagated to other buses via the bus coupling module boards 21. In the worst case, complete blocking of the whole multibus system can occur. This is the case for example in the switching system shown in FIG. 1 if interference or disturbance takes place at the precise moment where a data transfer is taking place between bus 11 and bus 13.

By a way of example, a permanent setting to zero of the following signals can lead to a disturbance able to be propagated to several adjacent buses.

In the category off signals in which disturbance leads to a blocking of allocation modules 35, the following ones can be noted:

the signal indicating block mode transfer (bus seizure for several cycles)

the priority group signal GP/;

the bus seizure signal BBSYG/.

The following signal disturbance or interference leading to blocking of the bus seizure logic 32 can be noted:

the strobe signal indicating existence of an address or data in cycle on the bus: ASG/and UDSG/;

the data acknowledgement signal DTACKG/;

etc.

This list of signals is for illustration and not exhaustive. It should be noted that these signals mentioned cause interference when they are permanently set to zero. Permanently setting a signal to 1, corresponding to its idle or non-active state, does not normally propagate disturbance to other buses.

Unblocking of the system involves the following functions being put into operation:
- a blocking detection function;
- a decongestion function for each bus, one after the other;
- a faulty bus or processor isolation function, with a possible specific processing for repair of the failed unit.

The bus decongestion function which is a constitutive element of the present invention consists in sending a specific and single decongestion signal 45, shown by a bold line in FIG. 3.

This single signal 45 involves two functionalities:
- releasing the bus 12;
- preventing other "master" boards connected to the bus 12 from intervening on the bus.

These two functionalities are fulfilled by an action firstly, on the bus request logic 34 and, secondly, via the inhibiting module 44, through acting on the allocation circuit 35 and the bus seizure logic 32.

Signal FINHAL 46 originating from inhibition module 44 is generated in synchronization with the clock signal CK synchronizing all the access allocation systems 35, and is held during the whole duration of the single decongestion signal 45. It travels on the same line as the inhibition signal 39 for the allocation module 35 upon an external instruction 40, 41.

The decongestion signal performs the following action on the allocation module:
- Inhibition of the request supplied to allocation module 35 by the request logic 34;
- Reset of the internal bistable in allocation module 35 authorizing participation in allocation and transmission of priority signals GP/and PR1 to PR7 to bus 12;
- Reset of the flip-flop generating signal BBSYG/ supplying the result of arbitration between the access requests, for the processor involved.

Secondly, the decongestion signal causes a reset of the internal flip-flop of the bus seizure logic 32 generating signals 38 for gaining control of the address and data buses.

Stated in other terms, as a result of this systematic action on the access management means of each processor on the bus, release of the bus by the current owner of the bus is ensured together with an assurance that the future owner of the bus deactivates its arbitration "winner" result signal, and finally ensures that no allocation module any longer participates in an access request arbitration operation.

The procedure employed then makes it possible to restart the requests that where canceled by action on the bus request logic 34.

Thus, the decongestion signal 45, 46 can be considered as a "super priority" signal for the allocation module 35. The decongestion process hence causes no disturbance either to the software configuration or to possible bus cycles currently running.

Figure 4:
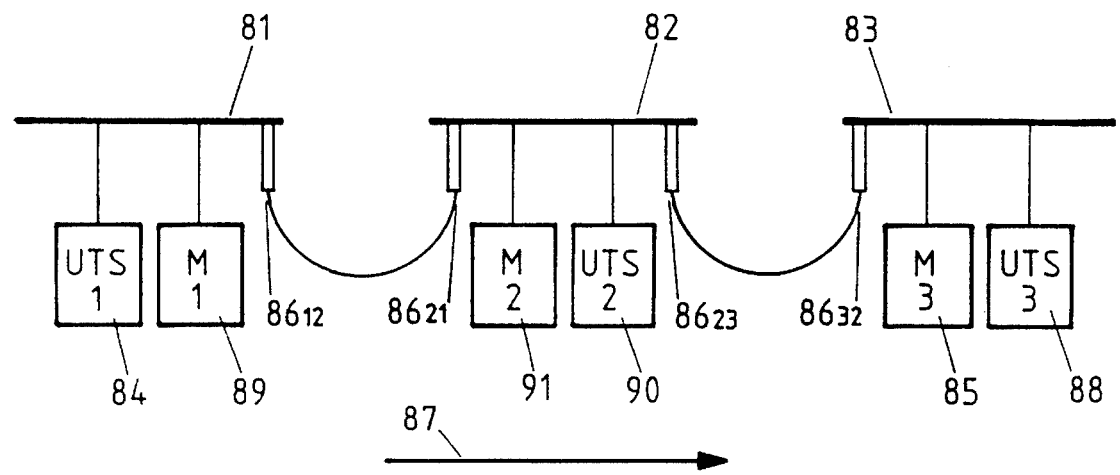
FIG. 4 illustrates a cascade deblocking process in accordance with the invention implemented in a blocked multibus system.

FIG. 4 illustrates the deblocking procedure which is implemented in the case where a blocking situation involves several buses.

The master board 84 connected to bus 81 is at the origin of a blocking condition in a cycle destined for the slave board 85 connected to bus 83. The three buses 81, 82 and 83 hence find themselves in a blocked situation. Blocking has for example been brought abut by a situation in which the strobe signal indicating existence of an address in cycle ASG/ is forced to zero on bus 81; it gets propagated over bus 82 and bus 83 in the direction of propagation 87 as a result of the fact that the bus coupling modules $86_{12}$ and $86_{23}$ are involved in communication as a result of the situation in which passing addresses are filtered.

The master board 88, or the system board (not shown) detects this blocking of the configuration and will immediately adopt measures to isolate the faulty bus by setting the allocation modules for the bus coupling module boards $86_{32}$, $86_{23}$, $86_{21}$ and $86_{12}$, thereby placing the faulty bus 81 in an inhibited or disenabled state.

The process is as follows:
- board 88 sends the decongestion signal over bus 83, which leads to bus release by bus coupling module $86_{32}$.
- board 88 next causes the decongestion signal to be sent by bus coupling module $86_{32}$ and destined for bus 82 via the intermediary of coupling module $86_{23}$; this allows bus 82 to be released by deblocking of coupling module $86_{21}$;
- board 88 then writes a disenabling bit for the allocation module of bus coupling module $86_{21}$, in order to isolate the failed bus 81;
- board 88 next brings successively on bus 82 and bus 83, the decongestions signal in the opposite state (idle or non-active level), in order to restart access requests that were inhibited.

Implementation of the single signal decongestion means is advantageously carried out in a multibus system having bus coupling modules that are equipped with simultaneous reciprocal access request management means (collision management) as described below. In effect, in this case, a highly favorable synergy exists between collision management and decongestion management, from the point of view of their similarity both as regards their structural characteristics and the functional characteristics of the corresponding systems.

The collision situation can be illustrated with reference to FIG. 4.

When board 84 wishes to reach board 91 it seizes and blocks bus 81. If at this precise moment, board 90 wishes for its part, to reach a board 89, it will seize and block bus 82. The two buses 81 and 82 now being blocked, the coupling modules $86_{12}$ and $86_{12}$ are not able to answer: we have a collision situation. If no specific unblocking device is provided, the system remains in the blocked state until "watchdog timer" signals appear on the master boards 84 and 90 which will switch over to error processing.

In order to avoid this problem, a collision signal COLG can be provided on the buses. This signal can be issued by each bus coupling module 86 when a collision is detected by the coupling module. In general terms, for each pair of coupling modules, at the time of first configuration initialization, a priority and a non-priority coupling module are defined If collision occurs, the non-priority module is the one which issues signal COLG. This signal is received by all the master boards on the corresponding bus, and brings about two actions:
- it causes the bus to be released by the board which seized it and is blocking it, by acting on the bus control signals. The board is then disenabled and awaits authorization in order to be able to re-seize the bus and finish its cycle;
- it prevents the other master boards from seizing the bus by acting on their allocation system.

Only the coupling module which issues the collision signal is able to seize the bus, and establish a path up to the destination of the cycle considered as having priority. When the path is set up, the coupling module stops sending signal COLG, and the other boards are again able to participate in a bus allocation phase, and then have access to the bus as a function of the results of arbitration.

A real synergy hence exists between the interbus collision resolution mechanisms and the multibus system deblocking process. It is hence advantages to use the same decongestion signal for implementing the two mechanisms.

Figure 5:
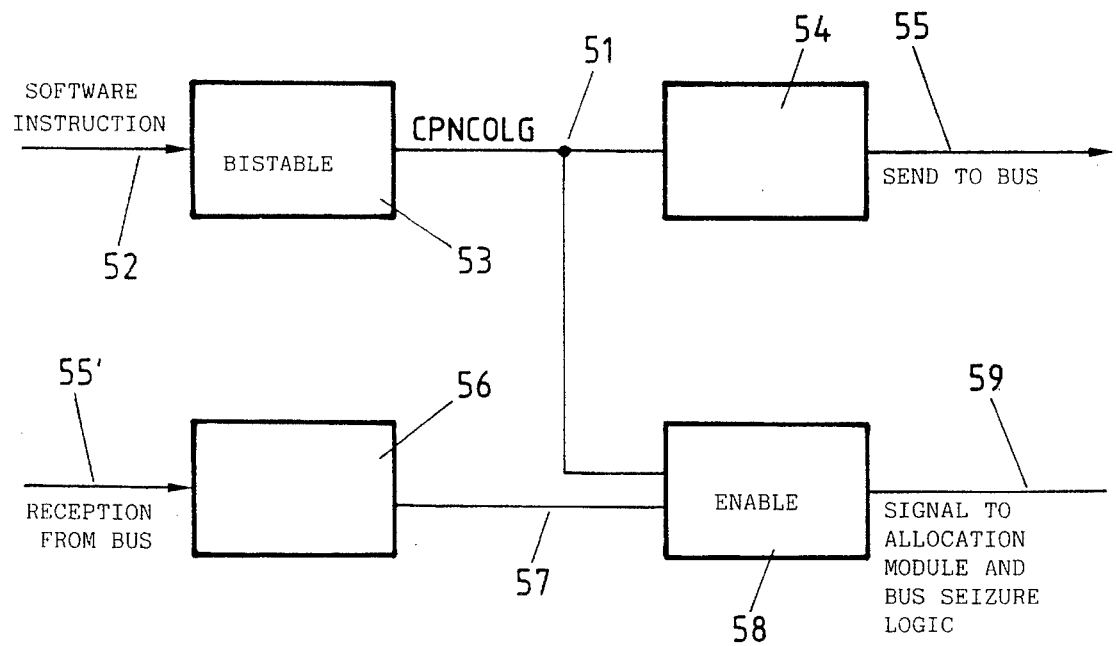
FIG. 5 shows the functional modules for generating a decongestion signal in accordance with the invention by the system board of the multibus multiprocessor system.

FIG. 5 is a schematic representation of the functional modules required on the system board in order to manage sending of the single decongestion signal and to provide collision resolution.

In order to put this configuration into practice, it is necessary to add, in the system board, in the UTS master boards for the buses and in the bus coupling modules, a bistable circuit able to issue the single decongestion signal. This bistable is program-addressable in the private area of the system and UTS boards, and in the coupling area of the bus coupling modules. This decongestion/collision bistable is for example set to 1 by a write cycle and then set to 0 by a further write cycle.

The issued decongestion signal is active on all the boards that are present on the bus with the exception of the board that issued it.

Figure 6:
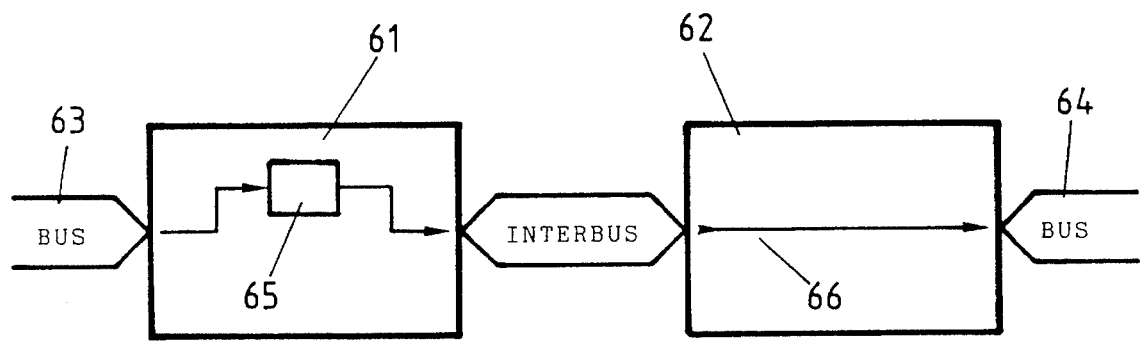
FIG. 6 illustrates thee method of the invention integrated into a bus coupling module.

FIG. 6 shows schematically the arrangement used in the case of a pair of bus coupling modules 61, 62 providing communication between a first bus 63 and a second bus 64. The mechanism is represented in one single direction, but obviously operates in a symmetrical manner in the other direction. The collision/decongestion bistable 65 in the coupling module 61 causes the decongestion/collision signal 66 to be issued by the bus coupling module 62 associated with it, and hence on the remote bus 64.

Figure 7:
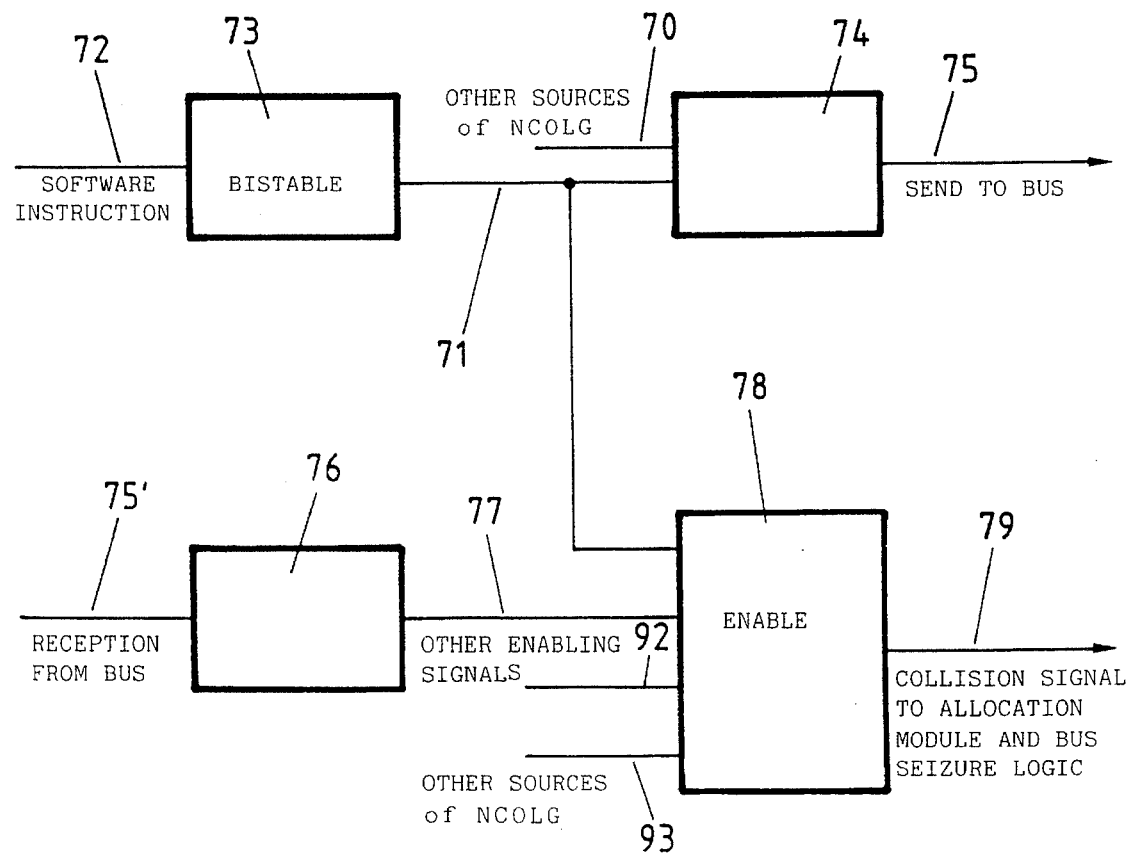
FIG. 7 shows schematically the functional modules that process the decongestion signal according to the invention in a bus coupling module provided with anti-collision logic for resolving reciprocal and simultaneous access request conflicts between two adjacent buses.

FIGS. 5 and 7 show schematically the logic modules needing to be provided in the system board on the one hand, and on the other hand in the bus coupling modules respectively, in order to provide management of the single collision/decongestion signal.

As shown in FIG. 5, for the system board, an internal signal 51 for commanding sending of a congestion/decongestion signal is provided by software instruction 52 via flip-flop 53. The single congestion/decongestion signal 55 is sent on the bus via a buffer circuit 54.

In order to acknowledge single collision/decongestion signals 55', which are not always sent by the system board, a buffer register 56 provides reception acknowledgement from the bus. The internal signals 51 from the software command to issue the collision/decongestion signal, and signal 57 originating from buffer register 56 handling reception from the bus, are supplied to an enabling circuit 58 supplying a signal 59 which brings about inhibition of the allocation module and of the bus seizure logic of the board when the collision/decongestion signal does not originate from the system board.

A configuration of the same type will be found again in the schematic representation in FIG. 7 which corresponds to the collision/decongestion signal acknowledgement logic in a bus coupling module board.

The internal collision signal 71 is generated by an external software instruction 72 via flip-flop 73. The software instruction originates from the remote bus coupling module (flip-flop 65 of the coupling module 61 in FIG. 6).

The internal collision signal 71 brings about sending of the collision/decongestion signal 75 on its bus via a buffer register 74. The bus coupling module will also issue the collision/decongestion signal 75 upon detection of a double simultaneous reciprocal request 70, when the bus coupling module board is not the priority one. This situation corresponds to detection of an actual collision on the pair of buses during which the non-priority bus coupling module is inhibiting the requesting entity on its bus.

Moreover, the bus coupling module acknowledges collision/decongestion signals 75 received from the bus which do not always originate from itself The received collision/decongestion signal 75' passes through buffer register 76 in order to supply an internal Signal 77 connected to one of the inputs of an enabling circuit 78. This circuit 78 supplies at its output a collision signal 79 to the allocation module and the bus seizure logic of the coupling module. The parameters which control sending of signal 79 are as follows:

internal collision signal 71;

internal signal 77 for reception of collision/decongestion over the bus;

an enabling signal 92 activated either by the decongestion signal upon a software instruction 72, or by a signal inhibiting acknowledgement of the collision when there is a double reciprocal simultaneous request in the pair of coupling modules;

a signal designed to cause line BBSYG to be released (next designated owner of the bus) at the end of block-mode transfer operations;

an acknowledgement signal for collisions on the remote bus.

These two latter signals arrive for example via the line 93.

The latter signal 93 (acknowledgement of collision on the remote bus) is necessary in order to cause release of the priority bus coupling module allocation module which was activated by the non-priority bus requesting entity (this requesting entity having be disenabled, as already mentioned, by the non-priority bus coupling module).

What is claimed is:

1. A method of unblocking a multiprocessor system, the system including at least one processing module having a plurality of processors each connected to a single main bus, means for arbitrating access requests from said processors and issuing a result, each of said processors requesting access to the bus, issuing the result of arbitration of all the accesses requested during a first phase; said result allocating the bus to a processor for a second phase, when the bus becomes available, including:

a main bus access management device;

means connected to said access management device for supplying to each processor of said module that requests an access to the bus a result of an arbitration of access requests made by the processors of said module, wherein the result is one of a positive and a negative result; and means for providing access to the bus by sending a bus ownership signal to one of said plurality of processors receiving a positive result, wherein said multiprocessor system can become blocked, the unblocking method comprising the steps of:

detecting the blocking of the means for supplying a result of an arbitration and of the means for providing access to the bus, caused by a disturbance of these means, sending to all the processors of said module one single decongesting signal if said blocking is detected; and immediately cancelling any positive result and any bus ownership signal in response to said decongesting signal terminating the access to the bus of said one of said plurality of processors.

2. The method of unblocking according to claim 1, wherein said canceling step comprises the step of inhibiting any signal indicating a participation in bus allocation from each one of the processors issuing a bus access request during a given cycle in said module.

3. The method of unblocking according to claim 1, wherein said multiprocessor system comprises a multibus system comprising at least two processing modules, each processing module communicating with at least one other module over a symmetrical pair of main bus coupling modules, each bus coupling module comprising means for providing access to its associated bus and means for providing a positive or negative arbitration result, the method further comprising the step of sending the decongestion signal to both the means for providing access to the bus and also to the means for providing a positive or negative result for each one of the coupling modules connected to any bus that is blocked.

4. The method of unblocking according to claim 3, wherein said multibus system includes a cascade of several buses interconnected by main bus coupling modules, said cascade being blocked, the method further comprising the steps of:
decongesting, in an iterative fashion, each one of the cascaded buses, said decongesting step comprising the step of alternating an operation in which the decongesting signal is sent to one of said cascaded buses in order to release the one cascaded bus, and sending to a bus coupling module of said released bus an instruction to transmit the decongesting signal to a next bus and/or an instruction inhibiting the means for providing access to the bus, of said coupling module, in order to isolate said next bus.

5. The method of unblocking according to claim 10, wherein the bus coupling modules are provided with means for collision management of reciprocal requests for access during a given cycle between two adjacent buses, wherein said bus decongesting signal and a collision resolving signal are one single signal.

6. The method of unblocking according to claim 1, wherein the system further includes a board containing at least one of the processing modules, said board connected to the bus, the method further comprising the steps of:
identifying one of a faulty board, a specific module of a faulty board, and a faulty board and a specific module of the faulty board that gave rise to a blocking situation; and
performing one of the operations of neutralizing said faulty board of said multiprocessor system, isolating said specific module, and neutralizing said faulty board of said multiprocessor system and isolating said specific module.

7. The method of unblocking according to claim 1, wherein the system further includes a board containing at least one of the processing modules, said board connected to the bus, and wherein said decongesting signal is generated in one of a system reset board of said multiprocessor system, and a supervisory board of one of the at least one processing modules of said multiprocessing system.

8. A method of unblocking a multiprocessor system, the system including:
a bus;
at least one processing module having a plurality of processors each connected to the bus, wherein each of the plurality of processors requests access to the bus during a first phase;
means for arbitrating access requests from the plurality of processors and issuing a result of arbitration of all the accesses requested during the first phase, wherein the result indicates allocation of the bus during a second phase when the bus becomes available to one of the plurality of processors requesting access, wherein each of the plurality of processors includes:
a bus access management device;
means connected to the bus access management device for supplying to each of the plurality of processors that requests access to the bus a result of arbitration of access requests made by the processors of said module, wherein the result of arbitration is one of a positive and a negative result; and
means for providing access to the bus by sending a bus ownership signal to one of the plurality of processors supplied with a positive result;
wherein at least one of the plurality of processors is always prevented from accessing the bus thereby blocking the corresponding means for supplying a result of an arbitration and means for providing access to the bus,
the unblocking method comprising the steps of:
(a) detecting blocking of the means for supplying a result of arbitration and of the means for providing access to the bus, caused by a disturbance of these means;
(b) sending to all the plurality of processors of the module a single decongesting signal if blocking is detected in step (a); and
(c) immediately cancelling any positive result and any bus ownership signal in response to said decongesting signal, thereby terminating access of said one of said plurality of processors to the bus.

9. A multiprocessor system comprising:
a bus;
at least one processing module having a plurality of processors each connected to the bus, wherein each of the plurality of processors requests access to the bus during a first phase;
means for arbitrating access requests from the plurality of processors and issuing a result of arbitration of all the accesses requested during the first phase, wherein the result indicates allocation of the bus during a second phase when the bus becomes available to one of the plurality of processors requesting access, wherein each of the plurality of processors includes:
a bus access management device;
means connected to the bus access management device for supplying to each of the plurality of processors that requests access to the bus a result of arbitration of access requests made by the processors of said module, wherein the result of arbitration is one of a positive and a negative result; and
means for providing access to the bus by sending a bus ownership signal to one of the plurality of processors supplied with a positive result, wherein at least one of the plurality of processors is always prevented from accessing the bus thereby blocking the corresponding means for supplying a result of an arbitration and means for providing access to the bus;
means for detecting blocking of the means for supplying a result of arbitration and of the means for providing access to the bus, caused by a disturbance of these means;
means for sending to all the plurality of processors of the module a single decongesting signal if blocking is detected by said means for detecting blocking; and
means for immediately cancelling any positive result and any bus ownership signal in response to said decongesting signal, thereby terminating access of said one of said plurality of processors to the bus.

* * * * *